June 26, 1962 H. G. FEISSEL 3,041,471
LEVEL LIMITING EMITTER BIASING CIRCUIT FOR PREVENTING COMPLETE CUT-OFF OF TRANSISTOR
Filed July 20, 1960
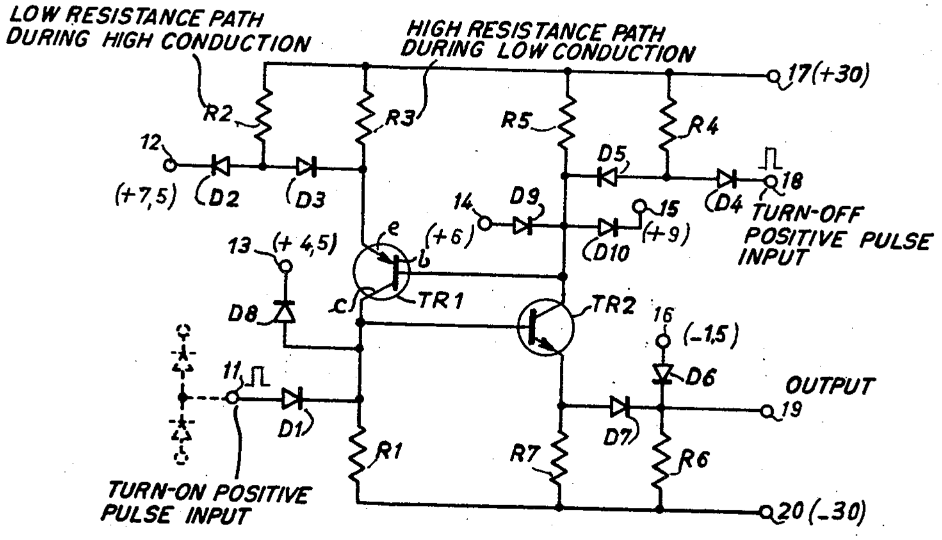
NOTE: TERMINALS 12-17 AND 20 ARE CONNECTED TO POTENTIAL SOURCES OF VALUES GIVEN.
Inventor:
Henri Gerard Feissel;
By his attorneys,
Baldwin + Wight

United States Patent Office 3,041,471

Patented June 26, 1962

3,041,471

LEVEL LIMITING EMITTER BIASING CIRCUIT FOR PREVENTING COMPLETE CUT-OFF OF TRANSISTOR

Henri Gerard Feissel, Paris, France, assignor to Compagnie des Machines Bull (Societe Anonyme), Paris, France Filed July 20, 1960, Ser. No. 44,202
Claims priority, application France July 22, 1959
2 Claims. (Cl. 307—88.5)

The present invention relates to transistor devices which may be triggered by rectangular pulses either in order to transmit them or to amplify or store them, and consists in an improvement which has the object of improving the response time of a feedback amplifier.

In the field of apparatus for the numerical processing of information, there is an increasing demand for triggering amplifiers or circuits having minimum natural response delay or capable of supplying pulses having steep fronts.

Now, the transistors at present available possess internal capacitances which prevent a rapid response. For example, in devices in which a transistor can alternatively assume a non-conducting or blocked state and a conducting state, a capacitance called the "transition capacitance" between the emitter and the base prevents a rapid response of the transistor to an external stimulus. In fact, the time taken by a transistor to change from the blocked state to the conducting state is proportional to the aforesaid capacitance and to the voltage which biases the base oppositely to the emitter.

According to the invention a transistor bistable arrangement comprises at least one transistor having emitter, base and collector electrodes which can assume a non-conductive condition and a conductive condition, and means for determining base and collector voltages in these two conditions, a two-level current limiting device being disposed between a first source of biassing potential and the emitter electrode of said transistor, said device including two resistors and two crystal diodes arranged so as to permit a feeble emitter current flow or quasi-blocked condition and to prevent back biassing of the emitter-base junction.

By way of example, the invention is applied to a bistable device comprising two transistors, but it will be obvious that it is applicable to other circuits having analogous operation.

For a better understanding of the invention and the method by which it is to be performed, an embodiment thereof comprising a bistable device, will now be described by way of example with reference to the single FIGURE of the accompanying drawing.

Referring to the drawing, the bistable device comprises essentially two transistors, of which one, TR1, is of the PNP junction type, and the other, TR2, is of the NPN junction type. As is known, the direct connection of the base of each transistor to the collector of the other transistor enables the device to assume two equally stable states, namely the blocked state in which the two transistors are non-conductive, and the unblocked state in which the two transistors are conductive.

The drawing indicates by way of example, at the side of terminals 12 to 17 and 20, the voltages which can be supplied by the feed sources (not shown) of the device. A set of resistance values (in kilohms) which has proved satisfactory is as follows:

| | |
|---|---|
| R1=10 | R5=18 |
| R2=1.5 | R6=2.7 |
| R3=27 | R7=47 |
| R4=1.2 | |

The diodes D are germanium crystal diodes. The terminal 18 is connected to a pulse generator not shown. The latter supplies a positive pulse which is transmitted by the diode D5. This pulse tends to make the base *b* of TR1 more positive than the emitter *e*, whereby TR1 and TR2 are blocked by the well known retroactive effect. The quasi-blocked state is thereafter maintained by virtue of the voltages applied to the various electrodes of the transistors and more especially to their bases.

The terminal 11 is connected to a pulse generator not shown. The latter supplies a positive pulse which is transmitted through the diode D1 and which is intended to render conductive TR2 and then TR1. There are represented by chain lines two diodes which limit the output voltages of this generator. In the absence of a pulse, the currents flowing through the diode D1 and through the resistance R1 are such that the voltage of the collector *c* of TR1, and consequently of the base of TR2, is −2.5 volts. When the circuit is in the "blocked" state, the diodes D3, D8, D9, D5 and D7 are oppositely biased, so that the currents flowing through them are negligible. The voltage limiter formed of the resistance R5 and the diode D10, on the other hand, fixes the potential of the base *b* of the transistor TR1 in the blocked state. This potential is about 9.2 volts.

With regard to TR1, the presence of the resistance R3 has the effect of maintaining a very small positive potential difference between the emitter and the base, whereby an emitter current of the order of 0.77 ma. is determined. With regard to TR2, the presence of the resistance R7 determines a very small negative potential difference between the emitter and the base, which results in an emitter current of the order of 0.47 ma. The current flowing through R5, however, is higher at this instant, the excess current flowing through the diode D10.

The voltage level of the pulse applied to the terminal 11 is limited to +2 volts. The resultant voltage rise across the terminals of the resistance R1 is sufficient to render conductive TR2 and then TR1. When this pulse has ended, a new state of equilibrium is set up, in the course of which, notably, the diodes D1, D2, D5, D10 and D6 are blocked. The greater part of the emitter current of TR1 passes through R2 and D3. The remainder of the collector current of TR1, which cannot pass through R1, flows through the diode D8. The greater part of the collector current of TR2 is supplied by the diode D9. Almost all the emitter current of TR2 flows through D7, on the one hand into R6, and on the other hand into a load impedance not shown, which may be connected between the terminals 19 and 20.

It will be noted that the assembly comprising the resistances R2, R3 and the diodes D2, D3 operates with respect to the emitter of TR1 as a low-impedance (R2) when TR1 must be highly conductive, and as a high impedance (R3) when TR1 must be substantially nonconductive. When TR1 has been blocked by a pulse which renders its base positive in relation to its emitter, this state cannot thereafter be maintained by reason of R3. When the two state circuit is in the blocked state, advantage is derived from the fact that it is the diode D3 which is blocked by inverse biassing and not the diode formed of the emitter and the base of TR1. Since the equivalent capacitance of the diode D3 is extremely low, it has no adverse effect on the rapidity of the response to the changeover. The assembly comprising the resistances R6, R7 and the diodes D6, D7 performs the same function with respect to the transistor TR2.

The application of the invention affords the further advantage that the device lends itself well to serial construction without necessitating any particular development for compensating for the variations of the characteristics which may arise in specimens of the same type of transistor.

I claim:

1. In a transistor bistable circuit comprising a first and a second source of predetermined potential, at least one transistor which may assume two different conduction states, a first diode and a limiting resistor serially connected between said first and said second source, and a second diode connecting the emitter of said transistor to the junction point of said first diode and said limiting resistor, a relatively high value resistor, the emitter of said transistor being connected to one of said sources through said relatively high value resistor to determine a feeble emitter current in the quasi-blocked state of the transistor.

2. In a transistor bistable circuit comprising two transistors of opposite types of conductivity, means adapted for determining two different conduction states of the transistors, the combination including a first source which supplies a first predetermined potential, a first crystal diode, a limiting resistor, said diode and resistor being series-connected respectively across said first source, a second crystal diode connecting the emitter of one transistor to the junction point of said first diode and said limiting resistor so as to conduct forward current in the same sense as the base-emitter junction of said transistor, and a second resistor of a value higher than that of said limiting resistor, connecting the emitter of said transistor to a second source of predetermined potential so as to permit a noticeable emitter current to flow in the quasi-blocked state of conduction.

References Cited in the file of this patent

UNITED STATES PATENTS

| | | |
|---|---|---|
| 2,872,594 | Logue | Feb. 3, 1959 |
| 2,888,578 | Bruce et al. | May 26, 1959 |
| 2,945,134 | Moody | July 12, 1960 |
| 2,990,479 | Henle | June 27, 1961 |